Figure 1:
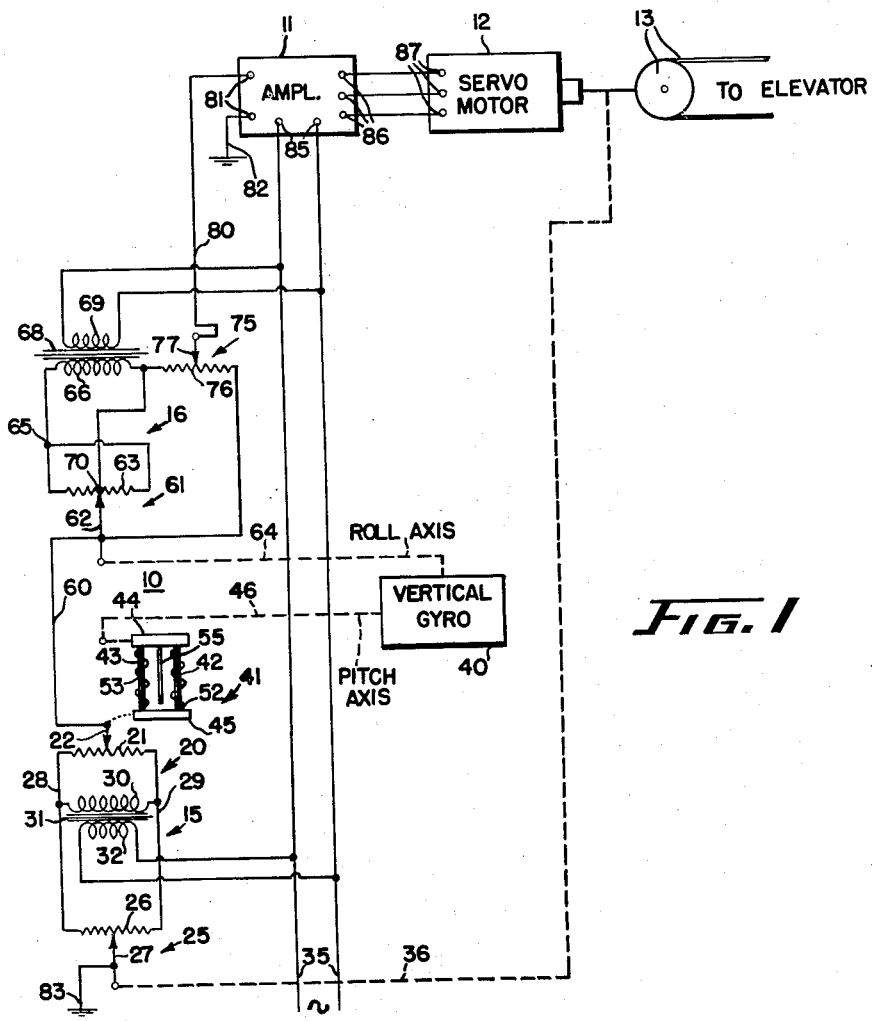

Dec. 9, 1958     W. H. GILLE     2,864,050
FLIGHT CONTROL APPARATUS

Filed Sept. 17, 1953     2 Sheets-Sheet 1

INVENTOR.
WILLIS H. GILLE
BY George H Fisher
ATTORNEY

Dec. 9, 1958 W. H. GILLE 2,864,050
FLIGHT CONTROL APPARATUS
Filed Sept. 17, 1953 2 Sheets-Sheet 2

*Fig. 3*

ERROR SIGNAL TO
AUTOPILOT WITHOUT
COMPENSATION

*Fig. 4*

AIRCRAFT
FLIGHT
LEVEL

AIRCRAFT FLIGHT UNDER
PHUGOID OSCILLATION

*Fig. 5*

ERECTION
MOTOR
ENERGIZATION

BACK ERECTION

FRONT ERECTION

*Fig. 6*

ERROR SIGNAL TO
AUTOPILOT DUE TO
COMPENSATION

UP ELEVATION

180° PHASE LEAD
TO PLANE ALTITUDE

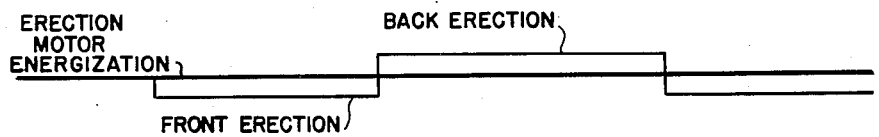

DOWN ELEVATION

INVENTOR.
WILLIS H. GILLE
BY George H Fisher
ATTORNEY

United States Patent Office 2,864,050
Patented Dec. 9, 1958

2,864,050

FLIGHT CONTROL APPARATUS

Willis H. Gille, St. Paul, Minn., assignor to Minneapolis-Honeywell Regulator Company, Minneapolis, Minn., a corporation of Delaware Application September 17, 1953, Serial No. 380,725

11 Claims. (Cl. 318—489)

My invention relates to improved flight control apparatus designed to dampen out extraneous oscillations imparted to the flight of an aircraft and in particular to dampen out the acceleration known as phugoid acceleration.

The improved flight control apparatus of my invention relates primarily to pitch axis automatic pilot aircraft control and in particular to automatic control apparatus which utilizes a vertical reference member such as a vertical gyroscope to sense displacement between the aircraft and a reference position and operate through a controlling circuitry a servomotor to position a control surface of the aircraft and thereby maintain the predetermined flight attitude of the aircraft. It will be appreciated that my improved flight control apparatus can be utilized in controlling other flight axes of the aircraft where accelerations act upon the vertical reference member and the gravity sensing control equipment associated therewith to cause oscillations in aircraft flight.

One of the common accelerations imparted to an aircraft in flight is that known as the phugoid type of oscillation which will tend to cause an aircraft to wander in the pitch axis generally starting into a slight dive and increasing the acceleration of the aircraft. The acceleration force on the gravity sensing device tends to displace the gravity sensing device and in the case of a mercury switch the mercury therein to an extent where it will operate the sensing device thereby operating the associated erection equipment for the vertical reference member or vertical gyroscope and precess the gyroscope in pitch very slowly such that it follows the position of the aircraft to apparent vertical positions or positions other than true vertical. The actual displacement of the gyroscope as the aircraft assumes a nose-down flight attitude in initially responding to the acceleration force, however, does not provide sufficient signal to the associated automatic pilot equipment to initiate a correction at this time because it is small in magnitude and in phase with the aircraft oscillation. When the aircraft stabilizes in a nose-down attitude, the gravity sensing device returns to a normal position, that is, the mass aligns itself with the gravitational force tending to operate the device in the opposite direction thereby energizing the erection motor in the opposite direction and precessing the gyroscope back to a true vertical position. At this time the gyroscope will sense the displacement from vertical or level flight position and put a small signal into the autopilot to try to overcome this attitude change. As pointed out above, this signal is small in magnitude and in phase with the aircraft attitude and hence damping of the aircraft oscillation does not occur. As a resulting operation, there is a change to a climbing attitude at which point the deceleration forces cause the mercury or gravity sensing device to engage or operate in the opposite direction providing for a false erection of the gyroscope again to apparent vertical positions or a following of aircraft position and until this situation is stabilized the gyroscope will not truly sense aircraft attitude with respect to true vertical. The error due to pitch attitude change and that due to the acceleration effect on the gravity sensing device causing the gyroscope to erect to apparent vertical positions for the most part cancel themselves out or are in opposition to one another with the balance being in phase with the aircraft oscillation and consequently the automatic pilot receives little error signal to energize the servomotor and act in a proper sense to counteract the effect of the oscillation of the aircraft through movement of the control surface.

In the subject invention, whenever the gravity sensing apparatus of the vertical gyroscope, such as a mercury switch, engages or operates to energize the erection motor, a pair of heaters associated with bimetal blades of an acceleration compensator are energized, the bimetal blades forming a coupling or drive from the vertical gyroscope to the signal potentiometer or signal generator associated with the pitch axis of the vertical gyroscope. This operation or energization of the heaters causes the bimetals to deflect depending upon the direction of displacement of the gravity sensing device with respect to the gyroscope and displace the wiper of the signal potentiometer inserting into the automatic control circuitry a signal which leads the oscillation of the aircraft by approximately 90 degrees. This signal operates to displace the control surface through energization of the servomotor and hence dampens out the oscillation of the aircraft. To provide for reversibility of operation of the coupling device, two bimetal blades are utilized and two heaters are associated therewith each heater being controlled by the gravity sensing device for its respective direction of displacement about the sensing axis and tending when energized selectively to displace the wiper of the signal potentiometer in one direction or the other to introduce a signal into the automatic pilot control apparatus which counteracts the oscillation produced by the acceleration forces. A slight time lag exists between the deflection of the coupling device and the initial energization of the heaters, but as will be later noted the coupling device has substantially the same rate of operation as the erection motor and the time lag operates because of its relationship with the erection motors in the direction of displacement of the coupling device to introduce the lead signal necessary to compensate for the aircraft oscillation.

It is therefore an object of this invention to provide an improved automatic flight control apparatus which dampens out extraneous oscillations imparted to an aircraft in flight.

It is also another object of this invention to provide in an improved automatic flight control apparatus a reference member which supplies controlling signals to the flight control apparatus which are modified to compensate for the acceleration effects on the aircraft.

A further object of this invention is to provide in an apparatus of this type an improved vertical reference member or vertical gyroscope, the operation of which is compensated for acceleration effects thereon.

Another object of this invention is to provide in an improved automatic flight control apparatus an improved vertical reference member with a signaling device associated therewith for operation thereby and a coupling therebetween which modifies the operation of the signal generator by the reference member to compensate for the acceleration effects on the aircraft.

Figure 2:
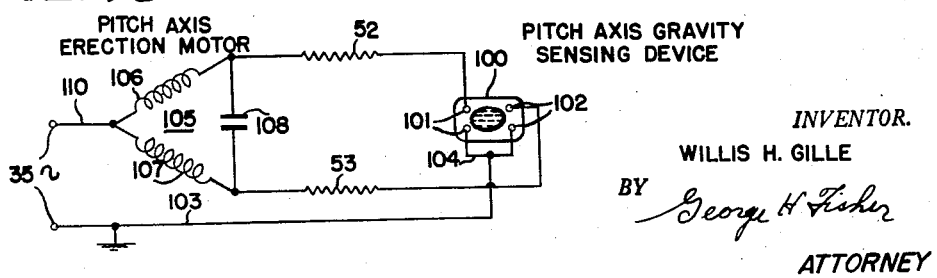

These and other objects of this invention will become apparent from a reading of the attached description together with the drawings wherein:

Figure 1 is a schematic diagram of a pitch channel of an automatic pilot for an aircraft and including the present invention, Figure 2 is a schematic diagram of an erection motor circuit for the gyroscope of the subject invention, and Figures 3-6 are a plurality of curves indicating the error signal from the control network to the autopilot, the flight oscillation of the aircraft, the erection motor signal and the compensated error signal to prevent oscillation.

My invention is shown herein as applying to control of a pitch axis of an aircraft and in particular to an elevator control channel of an automatic pilot for aircraft. The elevator channel of the autopilot includes a control network indicated generally at 10 and which supplies an error or controlling signal to an amplifier indicated schematically in block form at 11, the amplifier in turn controlling energization of a servomotor 12 whose output shaft operates to position the elevator control surface of an aircraft (not shown) by means of a suitable pulley cable indicated schematically at 13. Control network 10 comprises a plurality of individual bridges 15 and 16 connected together in a series additive relation and to the amplifier 11. Bridge 15 is formed by a potentiometer 20 having a winding 21 and wiper 22, to be hereafter identified as the pitch axis potentiometer, and a potentiometer 25 having a winding 26 and wiper 27, to be identified hereafter as the servo balance potentiometer. The extremities of the windings 21 and 26 are connected together by conductors 28, 29 to which also is connected a secondary winding 30 of a transformer 31 having a primary 32 which is connected to an alternating bus 35. The wiper 27 of the servo balance potentiometer is connected to the output shaft of the servomotor 12 as indicated by the broken line connection 36. The wiper 22 of the pitch axis potentiometer is operatively connected to the pitch output axis of a vertical gyroscope indicated schematically at 40 in block form through a suitable coupling device indicated at 41 the details of which will be hereinafter described. Except for the connection between the signal potentiometer or pitch axis potentiometer 20 and the vertical gyroscope 40, the details of the vertical gyroscope can be conventional. It should further be recognized that signaling devices other than potentiometers may be utilized in the control network, such as synchros, and the concept of the subject invention will not be altered. The coupling device 41 is attached to the gimbal of the gyroscope which is positioned in the aircraft normal or transverse to the line of flight thereof and substantially in a horizontal plane to provide for displacement of the rotor of the gyroscope about the pitch axis of the craft. This coupling device comprises a pair of bimetal blades 42, 43 mounted at their extremities on a pair of insulating blocks 44 and 45 in a substantially parallel relationship. Wound around the bimetals 42 and 43 are heaters 52 and 53 respectively which are connected in an electrical circuit to be later described. As shown in Figure 1, the block 44 is attached at the pitch axis of the gyroscope as indicated at 46 and the block 45 carries the wiper 22 of the pitch axis potentiometer 20 insulating the same from the remaining portion of the gyroscope. Under normal operation, displacement of the gyroscope gimbal about the pitch axis of the gyroscope will cause rotation of the coupling assembly 41 and movement of the wiper 22 directly imparting this movement of the pitch axis of the gyroscope to the wiper 22 and displacing the same relative to the winding 21 of the potentiometer 20 to provide for a signal output therefrom. When either one or the other of the heaters 52 and 53 are energized, their respective bimetal elements 42 or 43 will tend to warp or deflect displacing the block 45 relative to the block 44 and hence the wiper 22 relative to the winding 21. A heat insulating shield 55 is attached to block 44 to prevent the effect of one of the heaters from acting adversely upon the alternate bimetal not associated therewith. By selective energization of one or the other of the heaters, the block 45 may be made to deflect or displace relative to the block 44 in one direction or the other causing the movement of the wiper 22 relative to the winding 21 in one direction or the other and independent of the pitch axis displacement.

Bridge 15 is connected to bridge 16 by means of a conductor 60 which is connected to wiper 22 of potentiometer 20. Bridge 16 consists of a potentiometer 61 having a wiper 62 to which the conductor 60 is attached and a winding 63, this potentiometer being hereafter identified as the up elevator potentiometer. The extremities of the winding 62 are connected together at a common point 65 which in turn is connected to one extremity of a secondary winding 66 of a transformer 68 having a primary 69 which is connected to the alternating current source 35. The opposite extremity of the secondary winding 66 is connected to a center tap 70 of the winding 63. With this modified bridge type connection, it will be noted that a signal of one sense only will be derived between the center tap 70 and wiper 62 of the up elevator potentiometer and this will be in such a direction as to energize the amplifier and operate the servomotor toward the up direction only. This arrangement is a conventional one and is used in turns on aircraft to provide for a slight amount of up elevator to maintain altitude in turns.

A ratio potentiometer 75 having a winding 76 and wiper 77 is connected to bridge 16 to vary the amount of signal supplied to the amplifier 11. This potentiometer is connected at one extremity of its winding 76 to the conductor leading to the center tap 70 of winding 63 and at its other extremity to the wiper 62 of the up elevator potentiometer. The wiper 77 of the ratio potentiometer 75 is connected by a conductor 80 to one of a pair of input terminals 81 of the amplifier 11, the opposite input terminal being grounded as at 82. Similarly the servo balance potentiometer wiper 27 is grounded as at 83 to complete the input circuit to the amplifier 11. Amplifier 11 also has power terminals 85 which are connected to the alternating current bus 35 and a plurality of output terminals 86 which are connected to input motor terminals 87 of servomotor 12 to energize the same. Amplifier 11 while shown schematically can be any conventional amplifier and for a disclosure of a typical unit, reference is made to the Upton Patent 2,423,534, dated July 8, 1947.

Under normal operations of the flight control apparatus, that is when the airplane and the vertical gyroscope are not experiencing any acceleration effect, the operation of the elevator channel of the automatic pilot apparatus is largely conventional. The pitch axis potentiometer 20 acts as a primary controller and the vertical gyroscope which operates the same remains as a vertical reference in space necessitating no operation of its associated erection system to be later defined. A change in flight attitude of the aircraft will be sensed by the vertical reference member or vertical gyroscope 40 and the relative displacement between the gyroscope and the plane or the reference member and the airplane will be transmitted to the pitch axis potentiometer through the coupling device 41 which acts merely as a solid connection. This provides an error signal from the control network through a circuit which includes the bridge 15, and from the wiper 22 of pitch axis potentiometer 20 to conductor 60, to bridge 16, and from the wiper 77 of the ratio potentiometer 75 to conductor 80 and input terminals 81 of amplifier 11 being completed through the grounded connection 82 of the amplifier to the grounded connection 83 of wiper 27 of the servo balance potentiometer of bridge 15. This error signal actuates amplifier 11 to energize the servomotor 12 and causes rotation of the pulley and cable 13 to actuate the control surface changing the attitude of the aircraft in a direction to return the aircraft into a position of alignment with a vertical reference member or gyroscope 40. Operation of the servomotor also operates the wiper 27 of the servo balance potentiometer to provide electrical balance of the network in a conventional manner at which point the original flight attitude will be resumed.

The up elevator potentiometer 61 of bridge 16 is utilized for compensating for variation in aircraft altitude during turns and forms no part of the subject invention. The up elevator potentiometer channel is shown in the elevator channel here only once since it forms a part of the conventional automatic pilot system. As will be noted the wiper 62 of the up elevator potentiometer is connected by means of a shaft 64 to the roll axis of the vertical gyroscope through a solid connection and upon turning of the aircraft introduces a signal into the up elevator bridge 16 which signal is proportioned by the means of the ratio potentiometer 15 and fed to the amplifier 11 in turns to cause an up elevator movement of the control surface to compensate for loss of altitude in turns. Operation of the servo balance potentiometer with operation of the servomotor balances the network 10 in the same manner as was briefly described above.

The erection system of a vertical gyroscope is designed to keep the spin axis of the gyroscope aligned to the force of gravity in space or in a predetermined attitude with respect to a vertical position. In the present apparatus, a mercury switch indicated generally at 100 in Figure 2, and having a plurality of electrodes 101 and 102 at either extremity of the switch provides for reversible operation and a gravity sensing reference. The erection motors for the gyroscope, of which only the pitch axis erection motor is shown, is indicated generally at 105 as having windings 106 and 107 thereon with a phasing condenser 108 connected thereto in a conventional manner to provide for phase shifting of the current flow through one or the other of the windings depending upon the connection of the source thereto. The erection motor circuit is energized from the alternating current source such as 35 and includes the windings 106 and 107 connected at a common extremity to conductor 110 leading to one side of the source of power and connected at their opposite extremities to the extremities of the condenser 108. Also included in the erection motor energization and controlling circuit are the resistors 52, 53, the resistor 52 being connected at one extremity to the erection motor winding 106 and one extremity of condenser 108 with its opposite extremity connected to one of the contacts 101 of switch 100. The heater 53 is similarly connected to an extremity of winding 107 of erection motor 105 and also to the opposite extremity of condenser 108 and at its other extremity is connected to one of the contacts 102 of switch 100. The remaining contacts 101 and 102 of switch 100 are connected together by a common conductor 104 as indicated in Figure 2 with this common connection being connected by conductor 103 to the opposite side of the source of power 35. While I have shown the heaters or resistors 52, 53 this circuitry provides a conventional switching arrangement by means of which the mercury switch when the mercury engages the electrodes 101 will energize the heater 52 and winding 106 directly across the source of power in series and the winding 107 through the condenser 108 to provide for phase shift and a rotating magnetic field for the erection motor. Similarly, the engagement by the mercury with the electrodes 102 of the mercury switch 100 indicating tilt of the gyroscope in pitch in the opposite direction from a vertical position will energize the erection motor 105 with winding 107 to be connected directly across the source of power and through the heater 53 while the winding 106 is connected through the condenser 108 to cause a reversal of direction of torque or rotation of the erection motor. It will also be seen that depending upon the position of the mercury within the switch 100, one or the other of the heaters 52 or 53 will be energized.

The heaters 52 and 53 are associated with the bimetals 42 and 43 of the coupling device 41 such that when the gyroscope spin axis is displaced from vertical in one direction which would give a movement on the pitch axis potentiometer in a predetermined direction, the associated heater will be so energized as to cause deflection of the coupling device in the opposite direction from the original movement of the pitch axis of the gyroscope. Normally the erection system has been provided only for maintaining the spin axis of the reference member vertical, the spin axis tending to wander because of frictional errors introduced in the bearings of the gyroscope and windage effects. The erection system as modified herein will still operate in the conventional manner in returning the spin axis of the gyroscope to the vertical position should the errors referred to above or acceleration forces being imparted to the gyro-rotor tend to make it depart from the vertical position. In addition to the energization of erection motor, the heaters will operate the coupling device to introduce into the pitch axis potentiometers a signal which would not be seen in the conventional gyroscope because of the solid connection between the pitch axis and the associated signaling device.

The curves in Figures 3, 4, 5 and 6 of the drawings will disclose the utilization of the coupler or compensator in the automatic pilot control apparatus. The curves of Figures 3 and 4 as well as Figures 5 and 6 should be considered as having the same time base or abscissas. Considering Figure 4 it will be seen that an aircraft in supposedly level flight when it experiences a phugoid type oscillation will tend to wander from a level flight attitude in an oscillatory manner. An automatic pilot system without compensation of the subject invention will show a small in phase error signal to the associated amplifier and servomotor and hence the automatic pilot equipment will not correct the oscillation induced by the acceleration forces. This type of oscillation is brought about by the aircraft being disturbed by some force which causes the aircraft to gradually assume a nose-down attitude. In such a nose-down attitude the aircraft begins to pick up flying speed and as the aircraft accelerates, the acceleration force on the mercury switch tends to make the back set of contacts of the pitch mercury switch causing the erection motor to operate and precess the gyroscope in pitch to apparent vertical positions or in effect following the position of the aircraft. As pointed out above, the change in attitude of the aircraft and change in attitude of the spin axis of a sensing member or gyroscope are brought about gradually and the effect of these changes on the pitch axis potentiometer are in opposite directions and substantially cancel themselves out so that only a small amount of error signal in phase with the aircraft oscillation is applied to the autopilot and this signal is not in a proper sense to prevent the oscillation. Once the aircraft reaches a slightly nose-down attitude, the acceleration effect disappears and the erection system recognizing then that the spin axis has been displaced from a true vertical position will make at the other extremity of the switching device and cause the precession or erection motor to introduce a precession to bring the gyroscope spin axis back to a true vertical position. This change to the true vertical position also reflects a slight amount of signal to the pitch axis potentiometer which brings the plane out of its nose-down attitude and causes the aircraft to assume a nose up attitude. However, the operation of the erection motor on the spin axis as transmitted to the signal potentiometer is compensated for by the change in aircraft attitude and consequently there is only a small in phase signal applied to the autopilot while the aircraft is changing attitude in the oscillation.

In the subject invention, as will be evidenced in Figures 5 and 6, the operation of the erection motor also tends to operate one or the other of the heaters 52, 53 to cause a deflection of the coupling device which of itself is a slowly operated motor of the heat motor type to introduce an additional signal to the autopilot network. It will be noticed that acceleration forces on the mercury switch as indicated in Figure 5 introduces a certain amount of operation of the erection motor which have been labeled in Figure 5 as front and back erection to indicate the direction toward which the erection motors tend to precess the gyro rotor relative to the vertical position and with respect to the attitude of the aircraft at that time as shown in Figure 4. Thus the front erection effects taking place tending to precess the gyroscope slightly forward as the aircraft assumes the nose-down attitude tends to displace the gyroscope from the true vertical position to an apparent vertical position. As soon as the acceleration forces disappear, the erection motor is energized in the opposite direction tending to precess the spin axis of the gyroscope back toward the true vertical position and hence the back erection takes place. With the motor or coupling device 41 operative, the wiper of the signal potentiometer or pitch axis potentiometer 20 will be deflected in a direction opposite to the direction of precession of the erection motor. However, because a certain time lag is introduced by virtue of the operation of the coupling device 41, it will be seen from Figure 6 that the pitch axis potentiometer is directed in an up elevator direction after a short period of time of operation of the erection system toward a forward position and this deflection will be maintained for a given period of time after the erection motor has begun to operate in the opposite direction. Assuming as we have indicated before that there is a small signal derived from operation of the erection motor by itself or the displacement of the aircraft relative to the gyroscope which signal is in phase with the aircraft oscillation then the resultant or total error signal supplied to the automatic pilot during this type of oscillation brought on by acceleration forces on the aircraft as indicated in Figure 6 will introduce a lead signal which approaches 90 degrees lead from the attitude of the aircraft. This phase lead signal will dampen the oscillation of the aircraft and compensate for the effect of acceleration upon the same.

In considering this invention it should be kept in mind that the present disclosure is intended to be illustrative only and changes in detail especially in matters of shape, size or arrangement of parts or equivalent parts but in the principle of the invention may be made to the full extent indicated by the broad general meaning of the terms in which the appended claims are expressed.

I claim:

1. Apparatus for automatically controlling the flight of an aircraft, a vertical reference member including means sensing the force of gravity and means controlled by said gravity sensing means for maintaining said reference member in a vertical position, controlled means for positioning a control surface of the aircraft to control the flight thereof, circuit means for controlling the energization of said controlled means, signal generator means included in said circuit means and controlled by relative displacement between said vertical reference member and the aircraft, means coupling said signal generator to said vertical reference member for operation thereby, said coupling means including a pair of bimetal members and heaters associated therewith, said heaters being energized upon operation of said gravity sensing means to operate said coupling means and modify the operation of said signal generating means.

2. Apparatus for automatically controlling the flight of an aircraft, a vertical reference member including means sensing the force of gravity and means controlled by said gravity sensing means for maintaining said reference member in a vertical position, controlled means for positioning a control surface of the aircraft to control the flight thereof, circuit means for controlling the energization of said controlled means, signal generator means included in said circuit means and controlled by relative displacement between said vertical reference member and the aircraft, means coupling said signal generator to said vertical reference member for operation thereby, said coupling means including a pair of bimetal members and heaters associated therewith, and means including said coupling means controlled by the operation of said gravity sensing means to modify the operation of said signal generator means.

3. Apparatus for automatically controlling the flight of an aircraft about the pitch axis thereof, a vertical gyroscope mounted on said aircraft and including an erection apparatus for maintaining said gyroscope in a predetermined attitude, a servomotor for positioning the elevator control surface of the aircraft to control the flight thereof with respect to the pitch axis of the aircraft, circuit means for controlling the energization of said servomotor, signal generator means included in said circuit means and controlled by relative displacement between said vertical gyroscope and said aircraft, means coupling said signal generator to said vertical gyroscope for operation thereby, said coupling means including a pair of bimetal members and heaters associated therewith, and means energizing said heaters upon operation of said erection apparatus, said coupling means operating to modify the operation of said signal generator means.

4. Apparatus for automatically controlling the flight of an aircraft about the pitch axis thereof, a vertical gyroscope mounted on said aircraft and including an erection apparatus for maintaining said gyroscope in a predetermined attitude, a servomotor for positioning the elevator control surface of the aircraft to control the flight thereof with respect to the pitch axis of the aircraft, circuit means for controlling the energization of said servomotor, signal generator means included in said circuit means and controlled by relative displacement between said vertical gyroscope and said aircraft, means coupling said signal generator to said vertical gyroscope for operation thereby, said coupling means including a pair of bimetal members and heaters associated therewith, and means including said coupling means controlled by the operation of said erection apparatus to modify the operation of said signal generator means.

5. Apparatus for automatically controlling the flight of an aircraft, a pitch axis reference member including means sensing a predetermined pitch attitude of the aircraft and means controlled by said pitch attitude sensing means for maintaining said reference member in a predetermined position corresponding to said predetermined pitch attitude, control means for positioning a control surface of the aircraft to control the flight thereof about its pitch axis, circuit means for controlling the energization of said control means, a signal generator included in said circuit means and controlled by relative displacement between said pitch axis reference member and the aircraft, means coupling said signal generator to said pitch axis reference member for operation thereby upon relative displacement between said reference member and said aircraft, said coupling means including a pair of bimetal members and heaters associated therewith, and means energizing said heaters upon operation of said pitch attitude sensing means, said coupling means operating to modify the operation of said signal generator means.

6. Apparatus for automatically controlling the flight of an aircraft, a pitch axis reference member including means sensing a predetermined pitch attitude of the aircraft and means controlled by said pitch attitude sensing means for maintaining said reference member in a predetermined position corresponding to said predetermined pitch attitude, control means for positioning a control surface of the aircraft to control the flight thereof about its pitch axis, circuit means for controlling the energization of said control means, a signal generator included in said circuit means and controlled by relative displacement between said pitch axis reference member and the aircraft, means coupling said signal generator to said pitch axis reference member for operation thereby, and means including said coupling means controlled by the operation of said pitch attitude sensing means to modify the operation of said signal generator means.

7. Apparatus for automatically controlling the flight of an aircraft, a pitch axis reference member including means sensing a predetermined pitch attitude of the aircraft and means controlled by said pitch attitude sensing means for maintaining said reference member in a predetermined position corresponding to said predetermined pitch attitude, control means for positioning a control surface of the aircraft to control the flight thereof about its pitch axis, circuit means for controlling the energization of said control means, a signal generator included in said circuit means and controlled by relative displacement between said pitch axis reference member and the aircraft, means coupling said signal generator to said pitch axis reference member for operation thereby upon relative displacement between said reference member and said aircraft, said coupling means including a reversibly operated bimetal motor, and means energizing said bimetal motor upon operation of said pitch attitude sensing means for selective operation of said bimetal motor depending upon the direction of displacement of said pitch axis reference member from a vertical position to operate said coupling means and modify the operation of said signal generator.

8. Apparatus for automatically controlling the flight of an aircraft, a pitch axis reference member including means sensing a predetermined pitch attitude of the aircraft and means controlled by said pitch attitude sensing means for maintaining said reference member in a predetermined position corresponding to said predetermined pitch attitude, control means for positioning a control surface of the aircraft to control the flight thereof about its pitch axis, circuit means for controlling the energization of said control means, a signal generator included in said circuit means and controlled by relative displacement between said pitch axis reference member and the aircraft, means coupling said signal generator to said pitch axis reference member for operation thereby upon relative displacement between said reference member and said aircraft, said coupling means including a reversibly operated heat motor, and means energizing said heat motor upon operation of said pitch attitude sensing means for selective operation of said heat motor depending upon the direction of displacement of said pitch axis reference member from a vertical position to operate said coupling means and modify the operation of said signal generator.

9. Apparatus for automatically controlling the flight of an aircraft, a pitch axis reference member including means sensing a predetermined pitch attitude of the aircraft and means controlled by said pitch attitude sensing means for maintaining said reference member in a predetermined position corresponding to said predetermined pitch attitude, control means for positioning a control surface of the aircraft to control the flight thereof about its pitch axis, circuit means for controlling the energization of said control means, a signal generator included in said circuit means and controlled by relative displacement between said pitch axis reference member and the aircraft, means coupling said signal generator to said pitch axis reference member for operation thereby upon relative displacement between said reference member and said aircraft, said coupling means including a slowly operated motor means, and means connecting said slowly operative motor means to said pitch attitude sensing means to energize said slowly operated means with said pitch attitude maintaining means and operate the said coupling means to modify the operation of said signal generator means.

10. Apparatus for automatically controlling the flight of an aircraft comprising, a vertical gyroscope including means sensing gravity and erection means controlled by said gravity sensing means for maintaining said vertical gyroscope in a vertical position, a servomotor for positioning an elevator control surface of the aircraft to control the flight of the aircraft in pitch attitude, circuit means for controlling the energization of said servomotor, a signal potentiometer included in said control circuit means and controlled by relative displacement between said vertical gyroscope and aircraft attitude, means coupling said signal potentiometer to said vertical gyroscope for operation thereby, said coupling means including a slowly operated reversible motor means, and circuit means connecting said slowly operated reversible motor means to said erection means of said vertical gyroscope for energization therewith to reversibly operate the same depending upon the displacement of said gravity sensing means from said vertical position, said coupling means operating to position the signal potentiometer in a direction opposite to the operation of said displacement of said vertical gyroscope.

11. In automatic flight control apparatus for an aircraft; a servomotor adapted to be connected to a control surface of said aircraft for operating the same to control the flight of said aircraft; a primary controller including signal producing means; control circuit means including said signal producing means for controlling the energization of said servomotor; attitude reference means; means operatively connecting said attitude reference means to said primary controller, said signal producing means being thereby affected in response to controlling inputs from said attitude reference means; acceleration responsive means connected to said reference means; and means, included in said operative connection, connected to said acceleration responsive means, and effective for modifying the connection between said attitude reference means and said primary controller to compensate for the effect of acceleration on said attitude reference means.

References Cited in the file of this patent

UNITED STATES PATENTS

| | | |
|---|---|---|
| 2,415,092 | Frische | Feb. 4, 1947 |
| 2,487,793 | Esval | Nov. 15, 1949 |
| 2,775,421 | Markusen | Dec. 25, 1956 |

FOREIGN PATENTS

| | | |
|---|---|---|
| 662,853 | Great Britain | Dec. 12, 1951 |